5 Sheets—Sheet 1.

G. WESTINGHOUSE, Jr.
Telephonic Switches and Connections.
No. 224,565. Patented Feb. 17, 1880.

Witnesses.
C. L. Parker
R. H. Whittlesey

Inventor George Westinghouse Jr.
By Attorney George H. Christy.

5 Sheets—Sheet 2.

G. WESTINGHOUSE, Jr.
Telephonic Switches and Connections.

No. 224,565.  Patented Feb. 17, 1880.

Witnesses
C. L. Parker
R. H. Whittlesey

Inventor George Westinghouse Jr.
By Attorney George H. Christy

N. PETERS, PHOTO-LITHOGRAPHER, WASHINGTON, D. C.

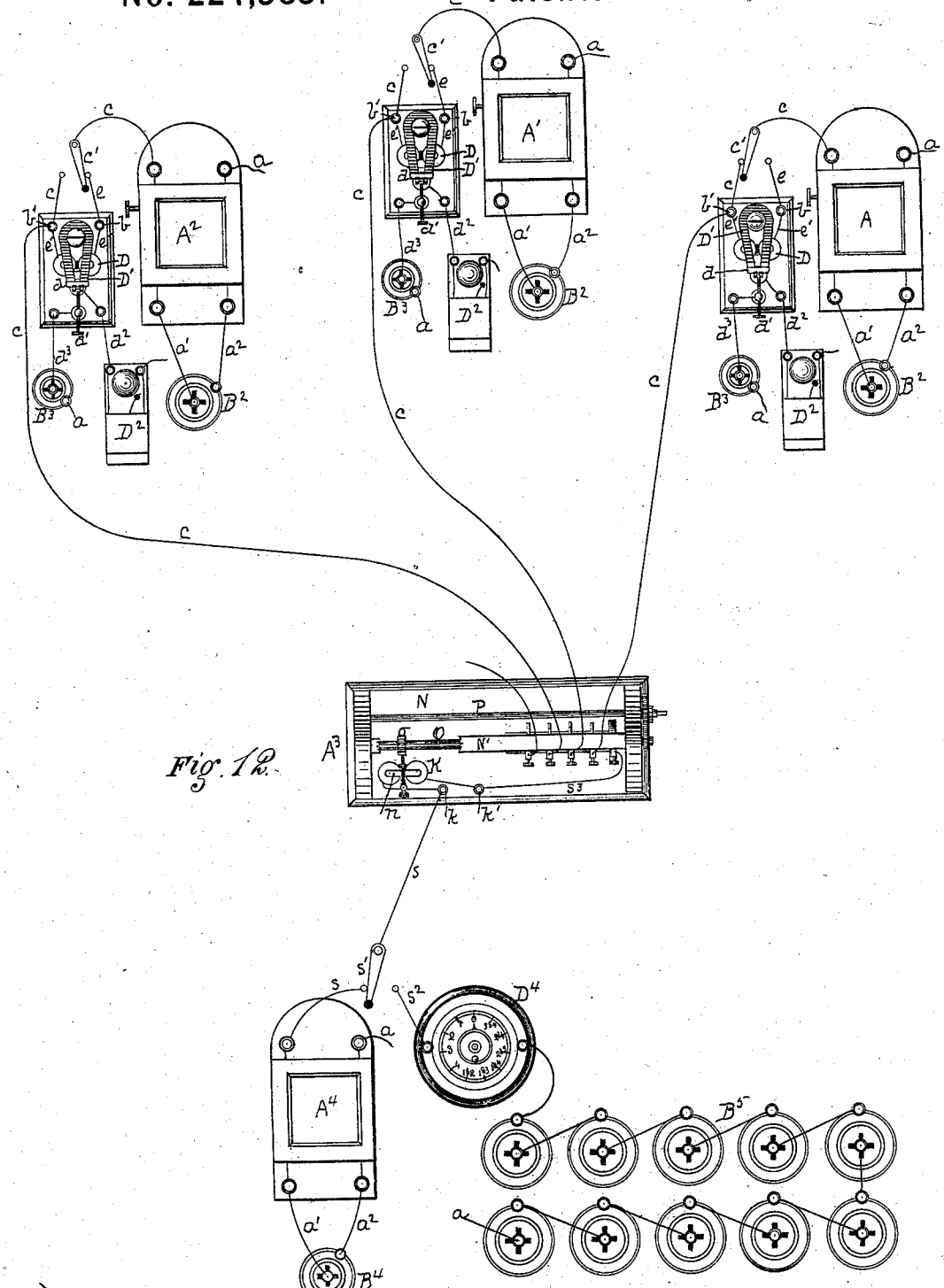

5 Sheets—Sheet 4.
G. WESTINGHOUSE, Jr.
Telephonic Switches and Connections.
No. 224,565. Patented Feb. 17, 1880.
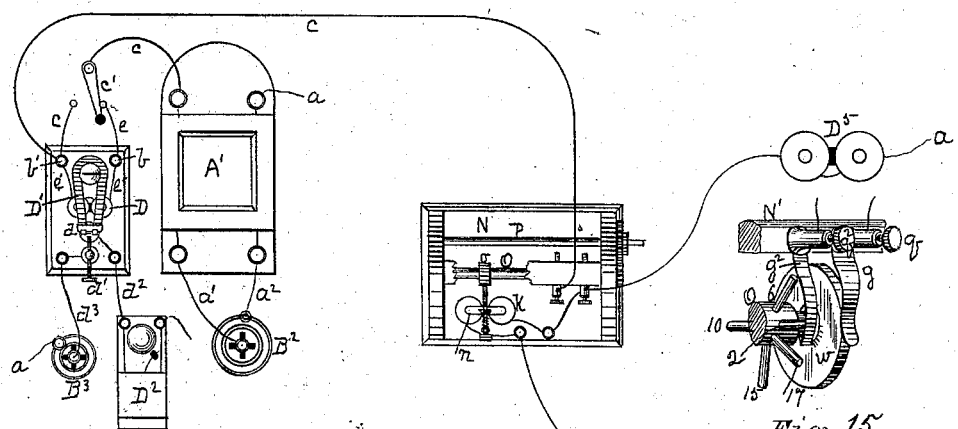
Fig. 15.
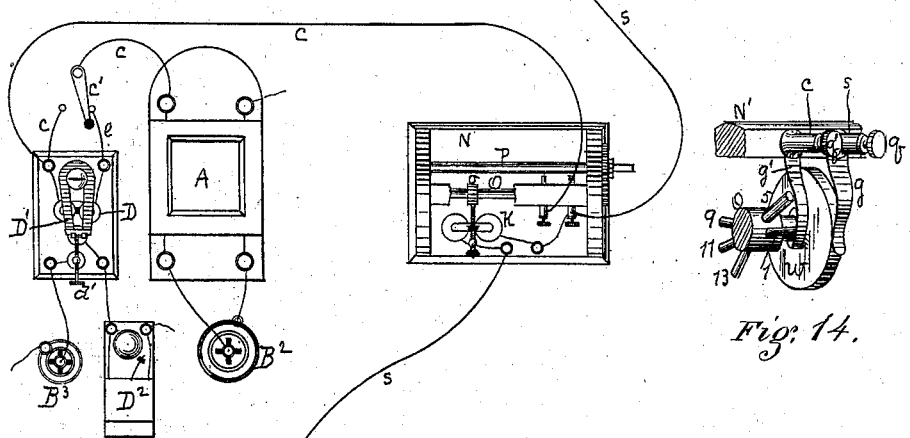
Fig. 14.
Fig. 13.
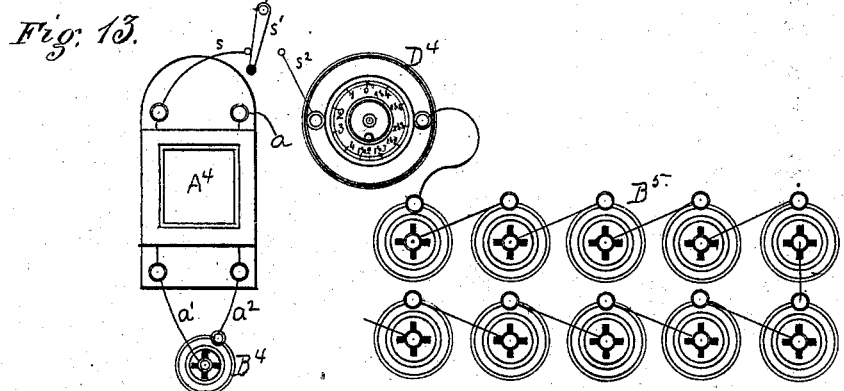
Witnesses
C. L. Parker
R. H. Whittlesey
Inventor George Westinghouse Jr.
By Attorney George H. Christy 5 Sheets—Sheet 5.

G. WESTINGHOUSE, Jr.
Telephonic Switches and Connections.
No. 224,565. Patented Feb. 17, 1880.

Witnesses
C. L. Parker
R. H. Whittlesey

Inventor George Westinghouse Jr.
By Attorney George H. Christy

N. PETERS, PHOTO-LITHOGRAPHER, WASHINGTON, D. C.

UNITED STATES PATENT OFFICE.

GEORGE WESTINGHOUSE, JR., OF PITTSBURG, PENNSYLVANIA.

TELEPHONIC SWITCH AND CONNECTION.

SPECIFICATION forming part of Letters Patent No. 224,565, dated February 17, 1880.

Application filed October 27, 1879.

*To all whom it may concern:*

Be it known that I, GEORGE WESTINGHOUSE, Jr., of Pittsburg, county of Allegheny, State of Pennsylvania, have invented or discovered a new and useful Improvement in Telephonic Switches and Connections; and I do hereby declare the following to be a full, clear, concise, and exact description thereof, reference being had to the accompanying drawings, making a part of this specification, in which—like letters indicating like parts—

Figure 1:
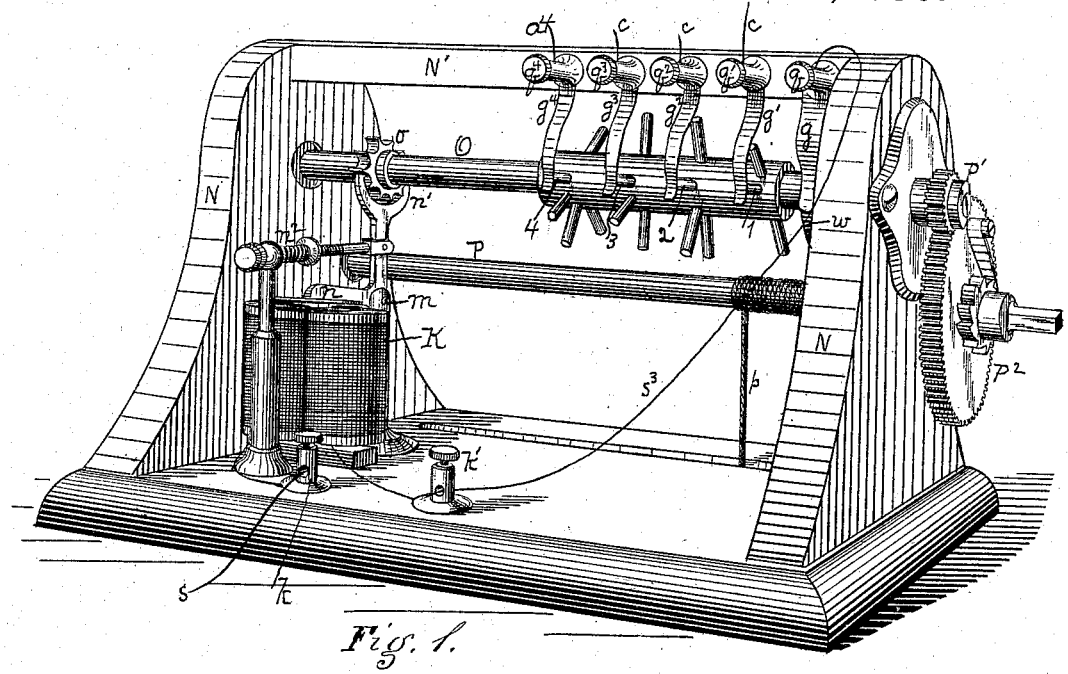
Figure 2:
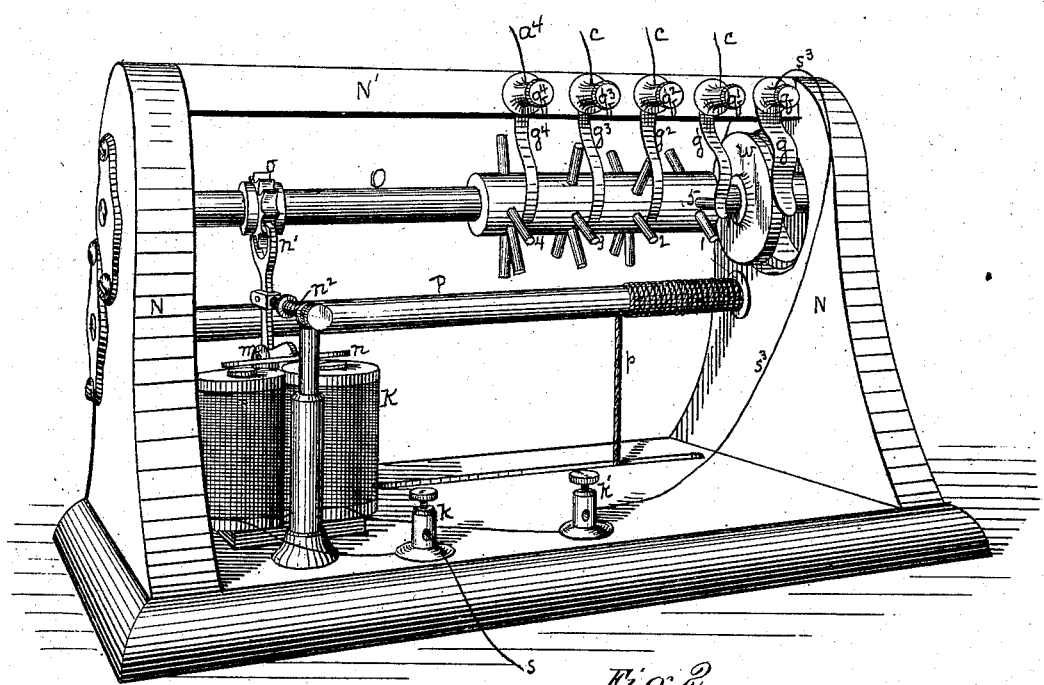

Figure 1, Sheet 1, is a view, in perspective, of the main operative parts of an apparatus embodying my present invention, and showing the same in its normal condition or at the zero-point. Fig. 2, by a like view of the same, shows the position of the apparatus when connection is made from user No. 1 with the main office. Figs. 3 to 11, Sheet 2, show, by detached views, other combinations presently to be explained; and Fig. 12, Sheet 3, is an outline view or plan diagram of so much of the entire apparatus and its connections as is necessary to make intelligible its construction and operation.

So far as my knowledge goes, all telephonic systems now in actual use require a separate independent wire from the main or central exchange to the house or office (which I will hereinafter term a "local station") of each user.

As telephones are now becoming exceedingly numerous in our larger cities, and as their use is being gradually extended to suburban localities, a great expense is necessarily incurred in the amount of wire required and in its care and maintenance, and also great complication results from the immense number of such wires.

Apparatus embodying my present improvement is chiefly to be employed at what I term, for convenience, "auxiliary exchanges," by which I mean any place so far remote from the main exchange that some advantage or saving may be found in bringing together two or more wires of as many local stations, connecting them to my apparatus, and connecting the latter by a single wire with the main exchange, so that thereby it shall be within the power of any local user having connection with such auxiliary exchange to call the operator at the central exchange, and by his aid be put in communication with any other desired user having a like connection with such auxiliary exchange, or with any user having a telephonic communication directly or by similar apparatus with the central exchange; and after the communications of such persons have been thus used for purposes of conversation in the usual way it will be within the power of the operator at the central exchange to restore such apparatus to its normal or zero or non-talking position, from which to again put any two users into communication, as a call from one may direct.

Referring to the diagram on Sheet 3, A A' A$^2$ represent the boxes or cases of an ordinary Edison telephone, of which there is one at each of three local stations; and I use the number three simply for convenience, as the number may be two or more. The ground-wire is (elsewhere as well as here) represented at $a$, and the line-wire at $c$, which latter (having an interposed switch, $c'$) leads to the auxiliary station at A$^3$.

A single main-line wire, $s$, extends thence to the main exchange, which is represented by the telephone-box A$^4$. At each local station a branch wire, $e$, leads from the switch $c'$ to a binding-post, $b$, the wire $c$ going to binding-post $b'$. From $b$ a wire, $e'$, leads, through an ordinary electro-magnet, D, to the post $b'$. This magnet performs, in part, merely the function of a resistance-coil, and in part it acts as a device for demagnetizing temporarily and at intervals a fixed or permanent magnet, D'. The latter has an armature, $d$, which, when the magnet D' is demagnetized, is held clear of the magnet by a spring of suitable form, or by a weight, and thereby is brought into contact with a set-screw, $d'$, whereby a circuit is made from the armature $d$, through wire $d^2$, to a bell-ringer and bell at D$^2$ on the one side, and from the set-screw $d'$, through wire $d^3$, to any suitable battery, B$^3$. A like battery, B$^2$, is represented at each local station, and another, B$^4$, at the main exchange.

In the main-line wire $s$, and at or convenient to the main exchange, I insert a switch, $s'$, the branch or side wire, $s^2$, of which leads, through a circuit-breaking dial, D$^4$, or its known equivalent, to a powerful battery, B$^5$, of several cells or cups—say six or eight, more or less.

In the wires leading to the batteries, $a'$ represents the connection to the positive pole, and $a^2$ the one to the zinc or negative pole.

The problem now is to enable any one of the local users at A A' A² to get and hold communication at any time with any other local user similarly connected, or with the main exchange, or with any user connected with the main exchange, using for such purpose only one line of wire between the main and auxiliary exchange, and dispensing with the necessary presence of an operator at the auxiliary exchange. To this end I arrange at the auxiliary exchange an apparatus shown only in outline at A³ in Fig. 12, but in enlarged view in Figs. 1 and 2. As here represented, the frame-work N is of wood or other low-conducting material. The shafts O and P, with their connecting-gearing P' P² and cord $p$, to carry a weight, represent one of the many known forms of clock-work.

K is a magnet, arranged to operate an armature, $n$, which is made of bent-lever or other suitable form, pivoted to a post, $m$, and terminating at its other end in an escapement, $n'$, the teeth of which engage a ratchet, $o$, so as to permit it to turn a distance of one, and only one, tooth at each movement of the armature. To give the latter a reverse throw a spring may be employed, as at $n^2$. Binding-posts $k$ $k'$ are added.

To the top bar or rail, N', of the frame N, I attach a series of metallic plates or springs, $g$ $g'$ $g^2$ $g^3$ $g^4$, and each is connected with a corresponding binding-post, $q$ $q'$ $q^2$ $q^3$ $q^4$. Also, on the shaft O, I mount a disk-wheel, $w$, in such position that it will at all times be in electrical contact with one spring, $g$. Also, on the same shaft I arrange a series of metallic spikes or pins, 1 2 3 4, &c., in such positions and of such lengths that as the shaft O revolves the ends of the spikes will engage and disengage the plates or springs $g$ $g'$, &c., as presently to be described.

The main-line wire $s$ is attached to the binding-post $k$, and, running thence through the magnet K to the binding-post $k'$, is connected by wires $s^3$ to the binding-post $q$. From the last post, $q^4$, of the series a wire, $a^4$, leads to the ground $q^4$—in this case an unused post—by which to make provision for an additional user. Unused posts may be provided in such number as may be thought future business will require; but all unused posts should have each a ground-connection, so as to maintain constantly such ground-connection, either through such posts or through the local ground-connections with reference to the rotation of the shaft O.

The normal or zero position of the auxiliary apparatus is shown in Fig. 1, the wheel $w$ and the spikes 1, 2, 3, and 4 engaging their respective springs or plates $g$ $g'$ $g^2$ $g^3$ $g^4$, so that users at A A' A² have each a direct means of communication through such connection, by wheel $w$, binding-post $q$, wire $s^3$, magnet K, and wire $s$, with the main exchange. At the same time the switches $c'$ are to be turned or set in connection with the branch wire $e$.

If, now, a user at A desires to call the operator at the main exchange, he first changes his switch $c'$ into connection with the wire $c$, leading directly to the auxiliary exchange at A³. The electric charge thus transmitted cannot or will not pass to the other local users at A' A², on account of the local resistance of the magnets D, the local batteries being insufficient to overcome such resistance, and for this purpose the wires leading from unused posts to the ground are to be furnished with a resistance-coil. The charge thus transmitted or induced will act over the main-line wire $s$ to ring a bell, drop a number, or give other signal at the central exchange, A⁴. The resistance by this line of communication should be considerably less than that through D and its connections.

By the use of the telephone-instruments the operator at A⁴ ascertains that the user at A wishes to talk with some person having a central-exchange connection. He then calls such person and switches on the proper wire; but in order that other users, at A' A², &c., may not be able to call at the same time, he first turns the switch $s'$ so as to bring the heavy battery B⁵ into the circuit, and then, turning his dial-wheel D⁴ till the pointer comes to 1, he makes and breaks the circuit, and thereby operates the armature-escapement $n$ $n'$, and turns the shaft O a distance represented by one tooth on the ratchet $o$, and to the position shown in Fig. 2. The spring-plate $g'$, which represents the connection from A, is then in electrical contact with the spike 5, so that electrical communication is uninterrupted from A to A⁴, through spike 5, shaft O, wheel $w$, spring-plate $g$, and so on, as already designated. All other spring-plates will now be free of any electrical contact with any of the spikes, so that users at A' A², &c., cannot call or interfere until the user at A is through. The operator at the central station then turns his dial till the pointer comes around to zero, whereby the shaft O is rotated around to the zero position, or that indicated in Fig. 1.

Figure 3:
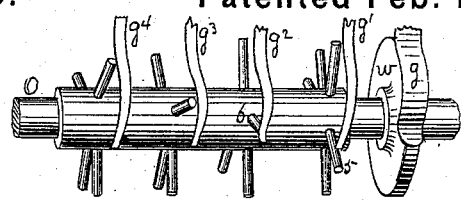

Assuming in the next place that a user at A' wishes to talk with the central exchange or with a user connected therewith, he proceeds in like manner as already described, and the operator at the central exchange also manipulates his switches and batteries as before, except that, the call being from the second local station, he turns his dial till the pointer comes to 2. He thus makes and breaks the connection at the armature K twice, so as to revolve the shaft O a distance represented by two teeth on the ratchet $o$. This brings the spike 6 into electrical contact with the corresponding spring-plate $g^2$, cuts all the other local users out of circuit, and, in the manner already described, opens connection from A' to A⁴, through $g^2$ O $w$ $q$, and so on, as already described. This position of the apparatus is shown in Fig. 3, Sheet 2.

Figure 4:
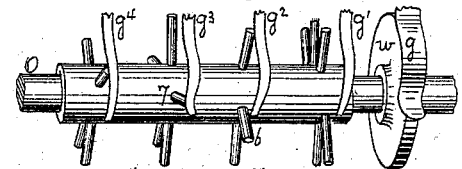
Figure 5:
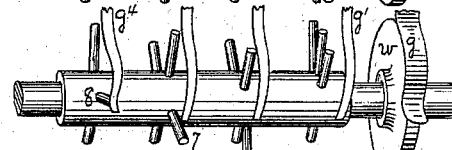
Figure 6:
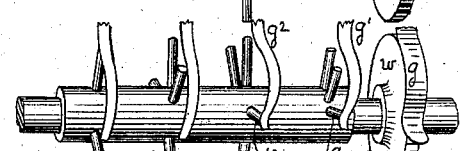

Turning the shaft O a distance represented by another tooth brings a spike, 7, into electrical contact with spring-plate $g^3$, establishes a circuit from $A^2$ to $A^4$, in the manner already described, and cuts out all other local users, as illustrated in Fig. 4. Another movement of the armature $n$ and ratchet $o$ in the manner already described will bring the spike 8 into the circuit, and throw all others out, as illustrated in Fig. 5. If this spike has only a ground-connection, as described, through wire $a^4$, no function will be performed, and this will be but a step in securing other connections; but if this wire be connected with a local station, the same as wires $c$, the user at such local station may thereby, on his own call and at his own request, be put in communication with other users in the manner already described.

The use of my apparatus which I will next describe is that in which a user at A may get communication and talk with a user at, say, A'. For this purpose the user at A calls the operator at $A^4$, in the manner already described. The latter then talks with him directly, as he may, and learns his wishes, or first shifts the apparatus to the position shown in Fig. 2, and then talks and learns what is wanted, the latter being the preferable way, as other users are thereby cut out of circuit. Having learned that A' is wanted, he operates the escapement $n'$ and ratchet $o$ by the use of the dial $D^4$ until he brings the apparatus to the position shown in Fig. 3, by which means he gets, through spike 6, an electrical communication with A' alone, the others being cut out. He then switches off the heavy battery $B^5$ and restores the line to connection with $B^4$. Now, by making and breaking the circuit in the usual manner, he sends a reverse current back from $B^4$ to the local station at A'; but at this station the switch is set in contact with the wire $e$, so that the charge passes through the magnet D, demagnetizes the fixed magnet D', releases the armature $d$, and puts into operation the bell-ringing circuit from $B^3$ to $D^2$. The ringing of the bell at $D^2$ of his own station is notice to the user at A' that he is wanted, and the operator at $A^4$ informs him as to what is wanted. The latter then again switches on his heavy battery $B^5$ and rotates the shaft O to the position shown in Fig 6, (a prearranged number on the dial indicating such position.) As here shown, a spike, 9, is brought into electrical contact with the plate or spring $g'$, (which has electrical connection with A,) and another spike, 10, is brought into electrical contact with the spring or plate $g^2$, (which has electrical connection with A',) and at the same time all the other spikes are free of electrical contact with their corresponding spring-plates, so that all other local users having wire-connections with $A^3$ are cut out. The user at A' then, having turned his switch $c'$ into the line $c$, talks with the user at A in the ordinary manner.

It is, of course, presumed all through this description that the local and central stations are to be supplied with the usual speaking and hearing telephonic devices.

When the users at A and A' are through talking, the operator at $A^4$, learning the fact in the usual way, switches on his heavy battery $B^5$ and rotates the apparatus around to the zero position, when it is in condition for further use.

Figure 7:
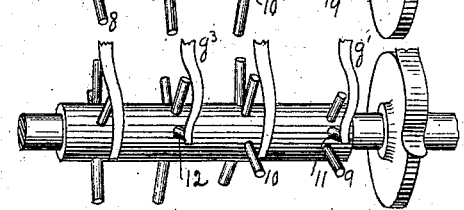
Figure 8:
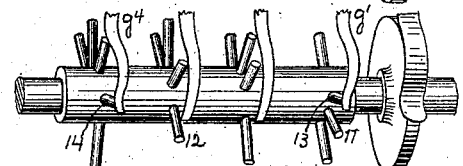

In order to secure the demagnetizing result referred to, corresponding poles of the batteries $B^4$ and $B^2$ should be connected—that is, positive with positive, as shown, or negative with negative. By reversing the order of procedure, a user at A' can call the central operator, and by his aid, through the described means or combinations, get electrical and telephonic communication with a user at A. To enable a user at A to get into telephonic communication with a user at $A^2$, I provide the shaft O with two other spikes, 11 and 12, which are brought into a common circuit, as represented at Fig. 7, by another motion of the armature $n$, escapement $n'$, and ratchet $o$, all other like circuits being thereby closed. By still another motion spikes 13 and 14, Fig. 8, are brought into a common circuit, so that users of wires connected therewith may converse.

Figure 9:
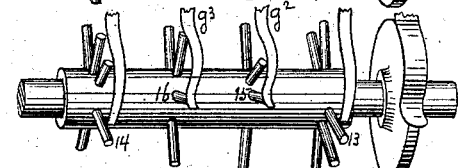

In Fig. 9 I have shown the adjustment or combination by which, through spikes 15 and 16, the users at A' and $A^2$ may be brought into communication, and, as before, all other circuits be closed or cut off.

Figure 10:
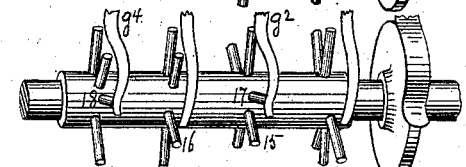
Figure 11:
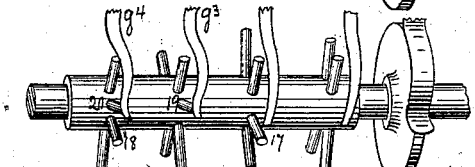

Fig. 10 shows the combination, by spikes 17 and 18, for a user at A' and one on what I have represented as the ground-wire (if such there be) to converse with each other, and in Fig. 11 I have shown, by spikes 19 and 20, a like combination for a user at $A^2$ and an additional user, if there be one.

In this way it will be seen that any one of the users at local stations having a connection with the auxiliary exchange can secure communication with and talk with any co-user having a like connection, all other co-users being shut out, and also with the central exchange and with any user having communication therewith, either directly or through other like auxiliary exchange, since it will be readily understood from the previous description that the central operator can call any one of the users having auxiliary-exchange connection, and cut off all the others.

In the operation and construction described the bell-ringing at the local station when the latter is called may be arrested by the user at A', who may press the armature $d$ up against its magnet D', or will be stopped by the central operator at $A^4$, who, in switching on his heavy battery $B^5$, increases the operative power of the fixed magnet D', whereby it is caused to attract and draw up the armature $d$, and so break the bell-ringing circuit.

In the apparatus described it is important, in passing from one combination or position to another, that at least one spike in the combination which is being left or broken should preserve or maintain an electric contact with its corresponding spring or plate until at least one spike of the next succeeding combination shall have made an electric contact with its corresponding spring or plate. The object of this is to prevent breaking of the circuit at points intermediate between the proper points for making breaks, the latter being fixed on the dial D⁴, and thereby to secure at each movement of the dial, or at each making and breaking of the circuit thereby, one complete motion of the shaft O—that is, from one operative position to another, as described; and this prolonged contact may be secured in any suitable way, as by a lengthened bearing on the spring, resulting from its curvature and spring action, or by a sufficiently long or continuous contact with a rigid plate.

In so far as relates to the use of the apparatus described, whereby one of two or more local users are enabled to be put into communication with and talk with the other without the necessary use of a separate wire for each from the central exchange, it will be observed that its efficiency depends in large part on the manner of arranging the spikes (or equivalent pins or other projections) on the revolving shaft or shafts—that is to say, in a succession of series or combinations in which, in one position or adjustment, (known as "normal" or "zero,") a spike for each local station having an electric wire connection with the central station shall have an electrical contact with a wire leading to the local station, and in each other or different operative adjustment or position (aside from the calling position) two spikes having electrical connection with each other and with a central station shall also each have a connection with one of two actual or contemplated local stations, all other local stations being cut off or thrown out of electrical communication with such two by the revolving of the corresponding spikes out of electrical contact with the connections leading to such other stations; and in this respect I do not limit myself to any particular forms of projections or to any particular manner of making electrical contacts between such projections and the communicating wires, or of changing such contacts.

It is obvious that the number of local stations may be considerably increased, and, whatever the number, a spike having a wire-connection with the central station should have in the first adjustment an electrical wire connection with the corresponding local station, and in each subsequent adjustment two spikes (and any two in any desired order) should have such connection and also with each other. Hence the number of possible combinations in the entire apparatus will equal one-half the number of actual or contemplated local stations multiplied by one less than such number, plus one more, all except the first one being by twos in successive series; but it will also be seen that as the spikes are arranged in circumferential rows around the shaft, each such row may be insulated from the next adjoining row, that the wires c, instead of going to the several binding-posts, may be arranged to make electrical connection with such rows of spikes, one wire to each row in regular order, and that the springs or plates g g', &c., may have a common and uninsulated connection with the main wire s, and as this would be only a reversal of the construction described I include it herein and as a mechanical equivalent within the scope of the following claims. Also, the same result may be secured in substantially the same way—that is to say, by groups of contact-points arranged in twos, and successively brought into contact or into operative positions by means of a single spike or projection for each local station and a series of springs or plates (or equivalent metallic contact-pieces) arranged in the paths of movement of such spikes, but in an orderly arrangement, substantially as above described, such that the spike corresponding to one local station, as A, shall at the first motion make contact with the metallic piece having connection with such station, the others being free of contact, and at each successive motion the spikes corresponding to two certain local stations shall make contact with the metallic contact-pieces having connections with such local stations, all others being out of contact, and such modifications I also include within my invention; and this feature of my invention—viz., the arrangement of movable contact-points in groups of two in such manner that as one group comes or is brought into electrical operative contact, as described, all others shall be out of contact—may be embodied in many ways in an apparatus adapted to perform the functions in question, which is the independent communication with each other of any two telephone-users, all whom are in connection by a single wire with the central exchange. One such way, differing somewhat from those described above, I have shown by diagram, Fig. 13, Sheet 4, and by detail views in Figs. 14 and 15 of same sheet. As here represented, like parts have the letters already described; but I dispense with the auxiliary exchange A³, or rather divide it up, putting a portion of the auxiliary apparatus at each of the local stations A A', of which I have thought it necessary to show only two, others being added, if so desired, as before.

Each local station has the frame-work N and the magnet K and its connections, as described. On the shaft O of station A, I arrange the disk-wheel w, Fig. 14, and the pins or spikes 1, 5, 9, 11, and 13 of Figs. 1 to 12, the same there constituting the first row, which there corresponds with the connections to first local station. Also, on the cross-bar N', I here arrange the binding-posts q q' and the spring-plates g g', the former bearing continuously on the disk w, and the latter being in the path of and making contact with the spikes as they revolve in succession; but the main-line wire s, instead of stopping here, as at the auxiliary exchange, is continued from the binding-post q of this station A to a like binding-post, which, with its spring-plate and disk-wheel, is duplicated at the next local station, A'. Also, on the shaft O at this local station I arrange the spikes 2, 6, 10, 15, and 17 (Fig. 15) of Figs. 1 to 12, the same there constituting the second row, and which there correspond with the connections to the second local station; and on the cross-bar N' of this station I arrange the corresponding binding-post $q^2$ and spring or plate $g^2$, the latter being in the path of the movement of the spikes, so as to make contact therewith as in succession they come around. Now these rows of spikes have, relative to each other, the same order which they have in Figs. 1 to 12, and the same force which rotates one will also rotate the other and to the same extent.

If a third local station is added, the third row of spikes is to be put on its shaft O, and so on for succeeding stations, and the wire $s$ is to be carried forward from one binding-post, $q$, to the next like binding-post having the same connections and through a like magnet, K. From the last binding-post the wire $a$ leads through a heavy resistance-coil, $D^5$, to the ground.

The manner of use with apparatus thus constructed will be the same as already described. As the main wire $s$ runs through all the magnets K, the armatures of all will be operated simultaneously, so that the shafts O will revolve together and bring the contact-points into communication by successive groups of twos, so as to enable any two users, at two predetermined or selected local stations, to be in telephonic communication and to converse with each other, all other local stations being cut out or off by the breaking or interruption of their contact-points; and it will be observed that in this construction and arrangement of the apparatus each local station will have two contact-points, one of which, consisting of the disk-wheel $w$ and its spring-plate $g$, is continuous, and the other of which, consisting of the pins and spring-plates $g'$ $g^2$, &c., is broken at intervals; and in this use of the apparatus like modifications can be made as those above.

In Figs. 16 to 20 of Sheet 5 I have illustrated still another mode of embodying and utilizing that feature of my invention which relates to the arrangement of movable contact-points in groups of two, so that one group being in contact all other groups shall be out.

The same letters that have already been used indicate like parts.

Here, as in Sheet 4, the auxiliary-exchange apparatus is divided up among and duplicated at the local stations in like manner; but in this construction and use of the invention two lines of wire are employed instead of one, as heretofore. The main-line wire $s$ is used now simply as an operating-wire to rotate the shafts O, but has no connection with the binding-posts on the cross-bar N'.

The several telephone-wires $c$ lead from the instruments to the corresponding binding-posts $q'$ $q^2$ $q^3$, as before, and a wire, $c^{10}$, leads from each duplicated binding-post $q$ to and connects with a main telephone-wire, $c^{20}$, which latter runs from the central station, at $A^4$, to the several local stations. The wire $s$ has the usual ground-connection at or beyond the farthest local station.

The only material respects in which the apparatus differs from that already described consist in the double line of wire, as already set forth, and in the use of a proper dial and circuit-breaker at each station, and in the fact that zero-spikes 1, 2, 3, and 4 are unnecessary.

In the making of the dial all possible or desirable modifications are provided for, each movement thereof bringing into contact position some one group of spikes, and rotating the previous group out. The first group may be indicated as 1 2, which, when the pointer comes to it, may mean that the contact-spikes of local stations A and A', forming one group, are in electrical communication with each other and each with the telephone-instrument of its own station, so that users at A and A' can talk with each other. The second group may be indicated as 1 3, which may in like manner indicate a like fact as to A and $A^2$, and enable users at such stations to talk as before, all other local stations being at the same time cut out, as before. Thus the possible or desirable combinations may be made up in groups of two and indicated on the dial $D^4$ by any suitable characters. Such a dial is arranged on each shaft O.

A circuit-breaker for each station (shown at R) is provided with the ordinary spring-key. Then, as the armatures of the magnets K may be operated and the shafts O be rotated (one tooth at a time) by the breaking and making of a circuit, it will be within the power of the user at any of the local stations to rotate all the shafts O of the apparatus on the entire line until his dial-pointer indicates the group, through the electrical contacts of which he can converse with such co-user as he may desire. All other groups are then out of electrical contact, and he prevents any other co-user of the same line from rotating him out of circuit by keeping his key depressed until he is through talking. Then on releasing his key the circuit through $s$ is restored, and any other co-user can operate it to any other combination or group and use it in like manner. The operator at the central station, $A^4$, has a like dial, and can operate the apparatus in like manner if occasion requires.

The usual or any known attachments for calling, signaling, &c., may be added.

The term "groups of two," or similar terms, as used herein, is intended to include any of the combinations of contact-points illustrated in Figs. 2 to 11 and other like combinations, even though, as a matter of fact, one of the electrical connections in such group, as by $w$ $g$, may be permanent or continuous. The operative contacts of such groups are made and broken by the rotation of the shaft, so as to make or break the contact of the other projection—as, for example, 5 in Fig. 2, 6 in Fig. 3, &c.; and for the purposes of the present case I consider the disk-wheel $w$ as mechanically a projection, (though a continuous one,) and as such an element in the composition of several of the successive groups; but it will be observed that when the spikes proper are employed as a group of two, to enable two co-users to converse with each other, as described, the disk-wheel $w$ forms a third member of the group, by which electrical connection is constantly maintained with the central exchange; and if the arrangement illustrated in Sheet 5 is desired for use without any central-exchange connection, then the disk-wheel $w$ may be dispensed with, or the first row of spikes may take its place.

Figures 16, 17, 18, 19, 20:
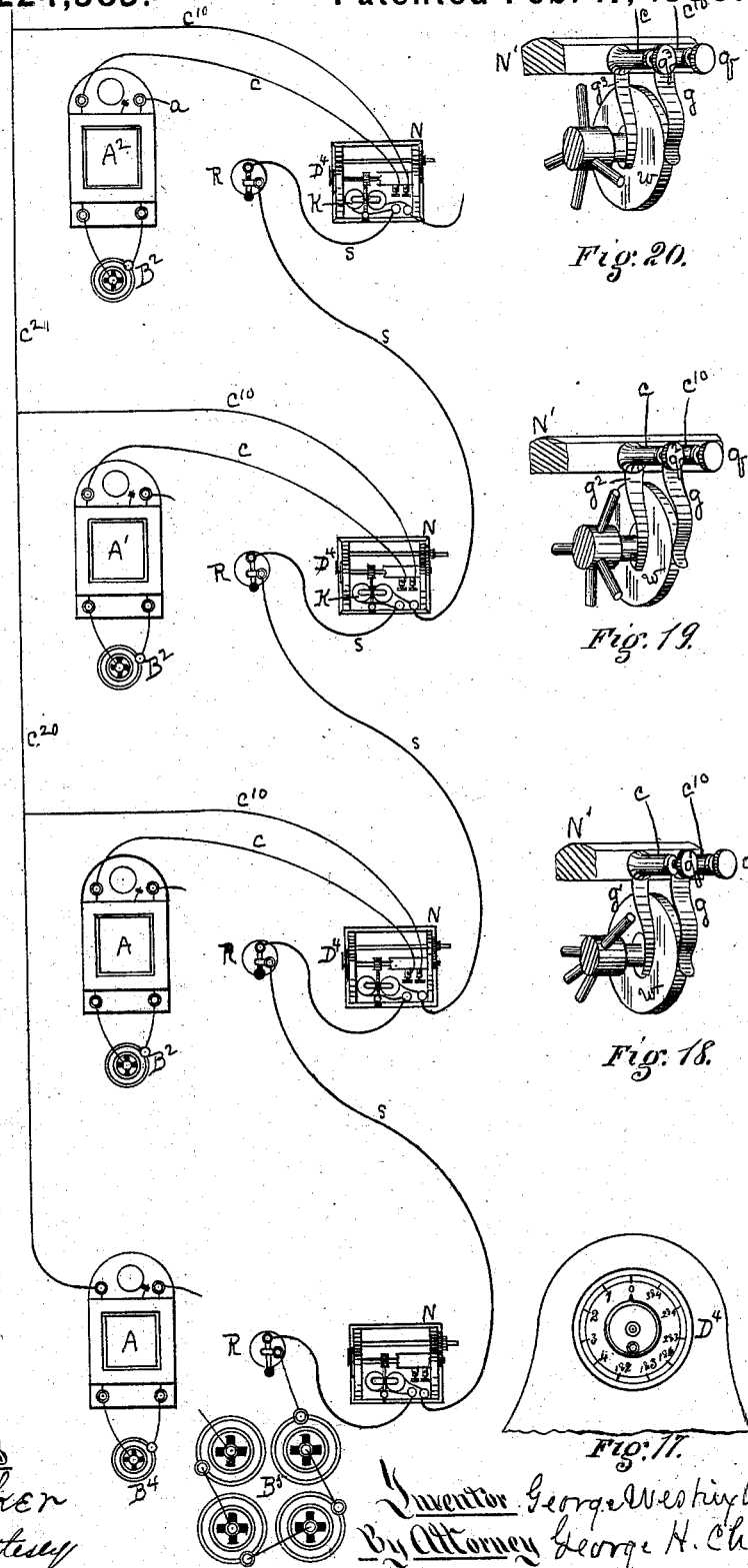

By a suitable arrangement of batteries and electro-magnets the wire $c^{20}$ of Fig. 16 may be connected with the wire $s$, each user being provided with a powerful battery and suitable connections for the purpose of calling the central station.

It will also be practicable, instead of operating the switch $s'$ by hand, as described, to arrange it so as to be shifted automatically into and out of contact with the branch $s^2$ by the action of the dial itself in its ordinary use for the purposes described, means for such operation being well known in the art.

I am aware that it is not new to rotate from a central exchange a single contact-point at a local station and out of electrical contact with a line leading to such central exchange, so as to open and close means of telephonic communication between an operator at such central exchange and a user at such local station, and also that any one of two or more local users can, by like means, be separately put into communication with the central exchange, and hence such features of construction are, separately considered, hereby disclaimed.

I am also aware that it is not new to arrange a series of instruments at successive stations on a main line, with a series of movable contact-pieces in each, and to so construct the appliances for operating such contact-pieces that the moving of one contact-piece at one station shall result in the moving of a certain predetermined contact-piece at one of the other stations; but such arrangement of connecting contact-pieces, one at one station and one at the next, is not what I mean by or include in the term "group of two," since the latter refers only to two contact-pieces in the same instrument, and capable of being moved into or out of position for making or breaking a through-circuit.

I claim herein as my invention—

1. A series of revolving electrical contact-pieces arranged in groups of two, such groups being successively movable into and out of a through-circuit, in combination with a magnet or magnets for effecting the desired movement of the contact-pieces, substantially as set forth.

2. A series of revolving electric contact-pieces and a series of fixed metallic pieces with which such contact is to be made, one or the other being arranged in groups of two, in combination with a magnet or magnets for effecting the desired movement of one group into contact and the previous group out of contact, and also in combination with a telephonic-wire communication from the contact-points of each group (when in contact) to corresponding separate local stations, and also to a central station or exchange, substantially as set forth.

3. The mode of putting any two local users connected with an auxiliary exchange or with a common main-line wire into communication with each other, by an operator at a separate central exchange, by causing from the latter place the rotation of a shaft or shafts having projections thereon, such projections being arranged in successive groups by twos, and which by such rotation are brought into electrical communication with the stations of the local users, while other groups for making contact with the lines of other users are rotated out of communicating contact, all substantially as set forth.

4. In a telephonic system wherein connection is made from two or more local stations over a single line-wire, $s$, with a central exchange, the combination of wires $c\ s$, magnet or magnets K, contact-pieces operative successively by groups of twos, battery $B^5$, and dial $D^4$, substantially as set forth.

5. The combination of revolving electrical contact-pieces arranged in groups of two on a series of shafts, O, in combination with a main-line wire, $s$, connecting the local stations, a series of magnets, K, and escapement-armatures, circuit-breakers R, and dials $D^4$, for rotating such shafts to predetermined positions, and also, in combination with a telephone-wire, $c\ c^{10}$, &c., connecting the local stations, substantially as and for the purposes set forth.

6. The combination of a revolving shaft or shafts having projections 1 2 3, &c., in any desired number, arranged for making simultaneously an electrical communication from an equal number of local stations with a common central station over a single wire, $s$, and one or more series of projections on such shafts arranged in successive groups of two for effecting electrical connection between any desired and previously-designated two of such stations and with the central station, all other local stations being cut out, substantially as set forth.

7. The combination of a system of rotating spikes arranged in groups of two, a line-wire, $s$, for rotating the same, telephonic wires $c\ c^{10}$ $c^{20}$, connecting the several local stations, and a circuit-breaker, R, for each local station, substantially as described, whereby each local user may rotate the apparatus to the desired position, and, by keeping the line broken, keep other local users out of circuit, substantially as set forth.

8. In a system of telephone apparatus having a series of local-station lines, $c$ and $e$, the combination of electro-magnet D, permanent magnet D', armature $d$, demagnetizing-circuit operating through D, and a battery-connection for increasing the power of the fixed magnet with reference to restoring its connection with $d$, substantially as and for the purpose set forth.

In testimony whereof I have hereunto set my hand.

GEORGE WESTINGHOUSE, JR.

Witnesses:
R. H. WHITTLESEY,
C. L. PARKER.